United States Patent [19]

Takada

[11] Patent Number: 5,118,930
[45] Date of Patent: Jun. 2, 1992

[54] RETROREFLECTIVE SHEET HAVING A STICKABLE SURFACE

[75] Inventor: Hirohisa Takada, Tokyo, Japan
[73] Assignee: Sony Corporation, Tokyo, Japan
[21] Appl. No.: 475,925
[22] Filed: Feb. 6, 1990

[30] Foreign Application Priority Data

Feb. 14, 1989 [JP] Japan .................. 1-034085

[51] Int. Cl.⁵ .................. G06K 7/10; G06K 19/02
[52] U.S. Cl. .................. 235/462; 235/488
[58] Field of Search ............ 350/103, 105; 235/488, 235/454, 462, 472

[56] References Cited

U.S. PATENT DOCUMENTS

| | | |
|---|---|---|
| 4,011,435 | 3/1977 | Phelps et al. |
| 4,020,327 | 5/1977 | Geary et al. ........... 235/61.11 |
| 4,085,314 | 4/1978 | Schultz et al. ........... 235/487 |
| 4,332,437 | 6/1982 | Searight et al. ........... 350/103 |
| 4,618,518 | 10/1986 | Pricone et al. ........... 350/103 |
| 4,691,993 | 9/1987 | Porter et al. ........... 350/105 |
| 4,712,867 | 12/1987 | Malek ........... 350/103 |
| 4,891,254 | 1/1990 | Bianco ........... 235/473 |

Primary Examiner—Stuart S. Levy
Assistant Examiner—Richard Weinberg
Attorney, Agent, or Firm—Lewis H. Eslinger; Jay H. Maioli; Donald S. Dowden

[57] ABSTRACT

A retroreflective sheet having an adhesive surface, including a transparent base film, a plurality of small retroreflective members arranged on one surface of the transparent base film, and a transparent bonding agent layer laminated over the small retroreflective members, wherein the exposed laminated layer is adhered to a reflecting surface, thereby forming a retroreflective sheet. Light beams reflected through the retroreflective sheet are substantially collimated with the incident light beams, thereby intensifying the reflected signal and allowing the optical information to be read by a bar code reader from greater distances.

4 Claims, 3 Drawing Sheets

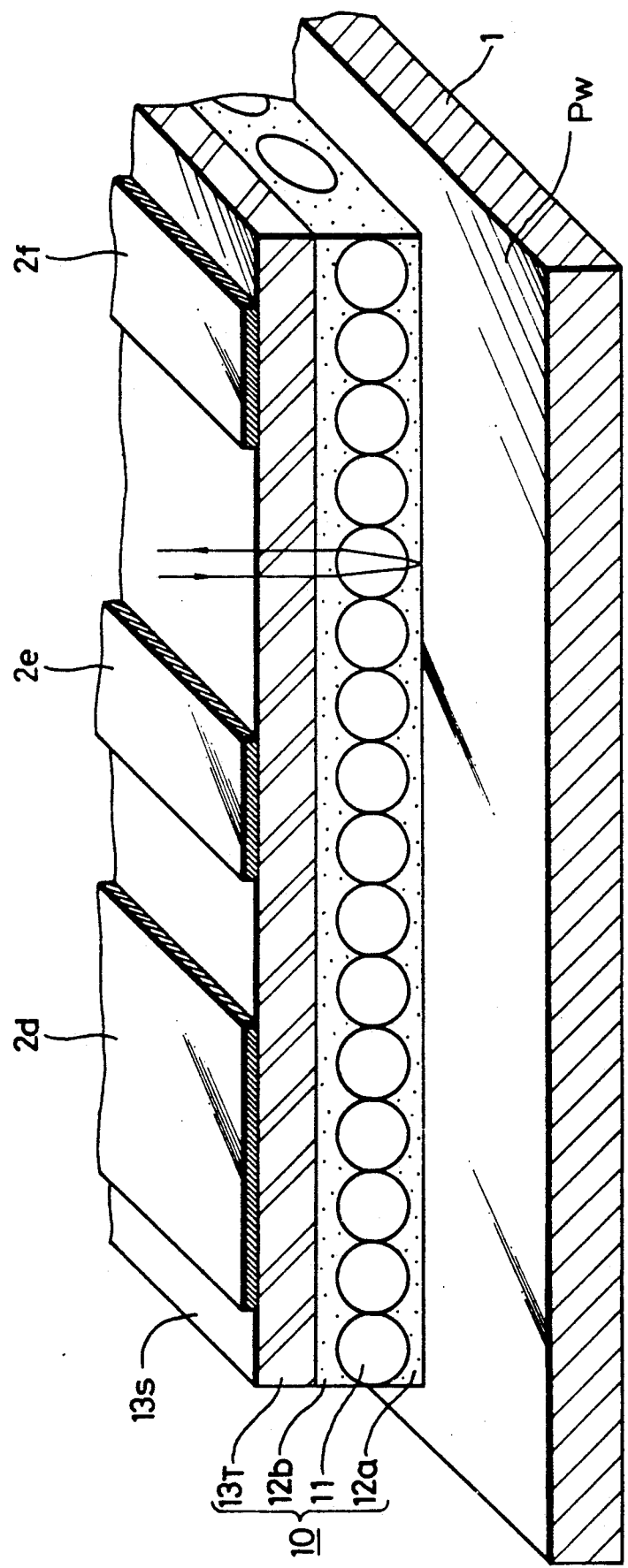

RETROREFLECTIVE SHEET HAVING A STICKABLE SURFACE

BACKGROUND OF THE INVENTION

1. Field of the Invention

The present invention relates generally to retroreflective sheets and, more particularly, to a retroreflective sheet having an adhesive surface that facilitates the reading of optical information from a remote distance.

2. Description of the Background

In order to automate a product distribution and administration system, bar codes and bar code readers are widely used. The bar code can indicate the contents and destination of a product by coding numerals thereon as a combination of bars of predetermined widths and having predetermined spaces therebetween. The bar code reader is used to optically read the bar code formed in such a manner.

The bar code may be a so-called "two-out-of-five" code that expresses values of 0 to 9 in the decimal notation by five binary bits, for example. A laser is the preferred light source for the bar code reader because of its many advantages, such as high light intensity, long life, and reading distance.

It has become desirable that the bar code be readable from greater distances. At the same time, it is desired that the bar code be so read without requiring modification to preexisting bar codes or to the conventional bar code readers.

To this end, it has been proposed that the light reflected from the bar code be concentrated in a predetermined direction to prevent scattering, thereby maximizing the amount of light that is focused onto the bar code reader.

For example, Japanese Utility Model Laid-Open Gazette No. 59-77101 describes a retroreflective sheet having the above-proposed property. In the manufacturing process of this retroreflective sheet, a metal foil is vapor-deposited onto a flexible base sheet such as cloth or paper, and a bar code is printed on the flexible base sheet. The bar code is composed of printing ink containing retroreflective glass beads, each bead having a refractive index greater than 2.

U.S. patent application Ser. No. 295,552 (Japanese Patent Application No. 63-39985) also proposes a bar code utilizing a retroreflective sheet. This previously proposed bar code utilizing the retroreflective sheet will be described hereinbelow.

The fundamental construction of such a retroreflective sheet is represented in FIG. 1. In FIG. 1, a plurality of very small balls or beads 11, each having a diameter of about 70 micrometers and made of glass or the like, are adhered to the entire surface of a base film 13 by means of a bonding layer 12 having a refractive index smaller than that of the glass beads 11.

If the wavelength of the incident light is constant and the refractive index of the glass bead 11 is properly selected, then the incident light can be substantially collimated with the reflected light, which includes the light refracted through the beads, reflected from the base film 13, and refracted again through the beads, and the light initially reflected from the surface of the beads 11. It has been found that the reflected, or more properly retroreflected, light from a retroreflective surface will have an intensity of more than 1000 times the intensity of the light reflected from a surface that does not contain retroreflective material, thereby increasing the distance at which such an improved bar code can be read.

U.S. patent application Ser. No. 295,552 discloses a positive-image bar code that utilizes the above-mentioned retroreflective material and is represented in FIG. 2.

As shown in FIG. 2, the bar code 10B is formed of a black base film 13BK on which reflecting portions, or bars 10a and dark portions, or spaces 10b are alternately aligned in accordance with a predetermined code. The positive-image bar code 10B may be modified to a negative-image bar code by inverting the bright reflecting portions and the dark portions.

Applying the above-proposed bar codes shown in FIG. 2 and in Japanese Utility Model Laid-Open Gazette No. 59-77101 to a preexisting physical distribution administration system requires that preexisting bar codes be replaced with new bar code patterns which must be printed and adhered to every product that is distributed according to the distribution system and then each new and existing bar code must be compared or checked on a per-unit basis, which is a laborious and time-consuming operation.

OBJECTS AND SUMMARY OF THE INVENTION

Therefore, it is an object of the present invention to provide an improved retroreflective sheet having an adhesive surface that can eliminate the defects encountered with the prior art.

More specifically, it is an object of the present invention to provide an improved retroreflective sheet having an adhesive surface through which optical information can be read from a remote distance with ease.

It is another object of the present invention to provide an improved retroreflective sheet having an adhesive surface that can be adhered on an existing bar code without modifying the bar code itself or the bar code reader.

According to an aspect of the present invention, a retroreflective sheet having an adhesive surface comprises a transparent base film, a plurality of small retroreflective members arranged on one surface of the transparent base film, and a transparent bonding agent layer laminated over the small retroreflective members, wherein the exposed surface of the laminated layer is adhered to a reflecting surface, thereby forming a retroreflective sheet.

The above and other objects, features, and advantages of the present invention will become apparent from the following detailed description of preferred embodiments when read in conjunction with the accompanying drawings, in which the same reference numerals are used to identify the same or similar parts in the several views.

BRIEF DESCRIPTION OF THE DRAWINGS

FIG. 4 is a perspective view of a retroreflective sheet having an adhesive surface according to another embodiment of the present invention.

DETAILED DESCRIPTION OF PREFERRED EMBODIMENTS

Figure 1:
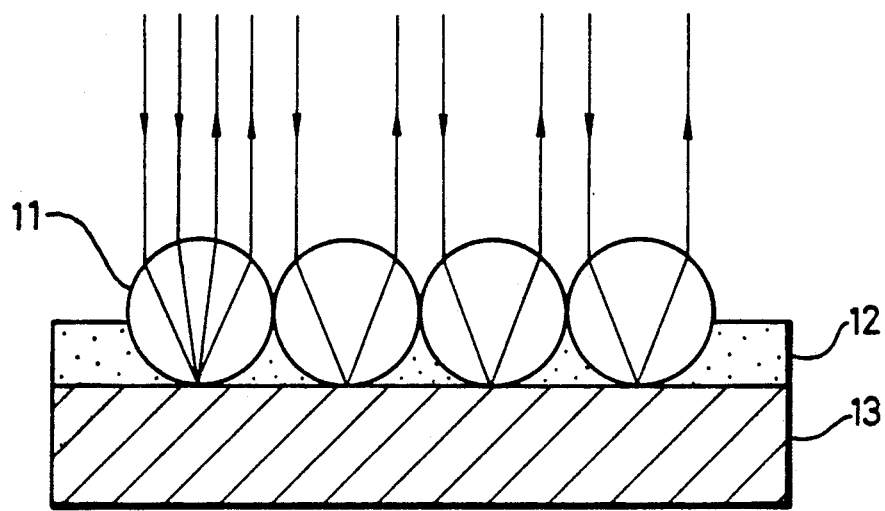
FIG. 1 is an enlarged cross section of a portion of a bar code according to the prior art, useful in explaining a fundamental construction of a prior art retroreflective sheet.
Figure 2:
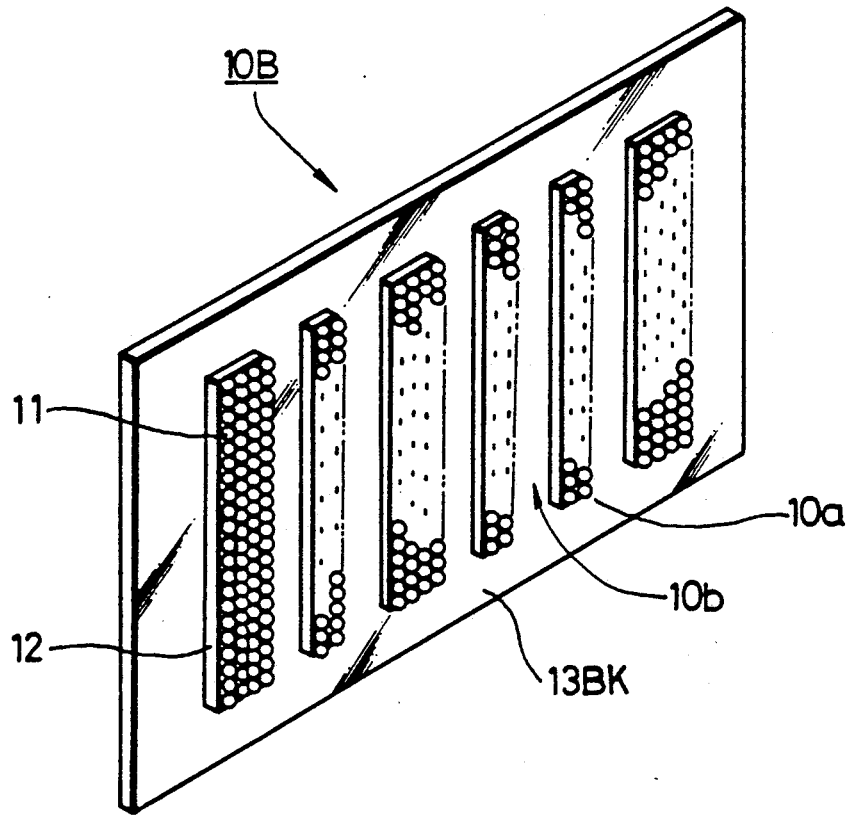
FIG. 2 is a perspective view of a prior art bar code utilizing retroreflective material.
Figure 3:
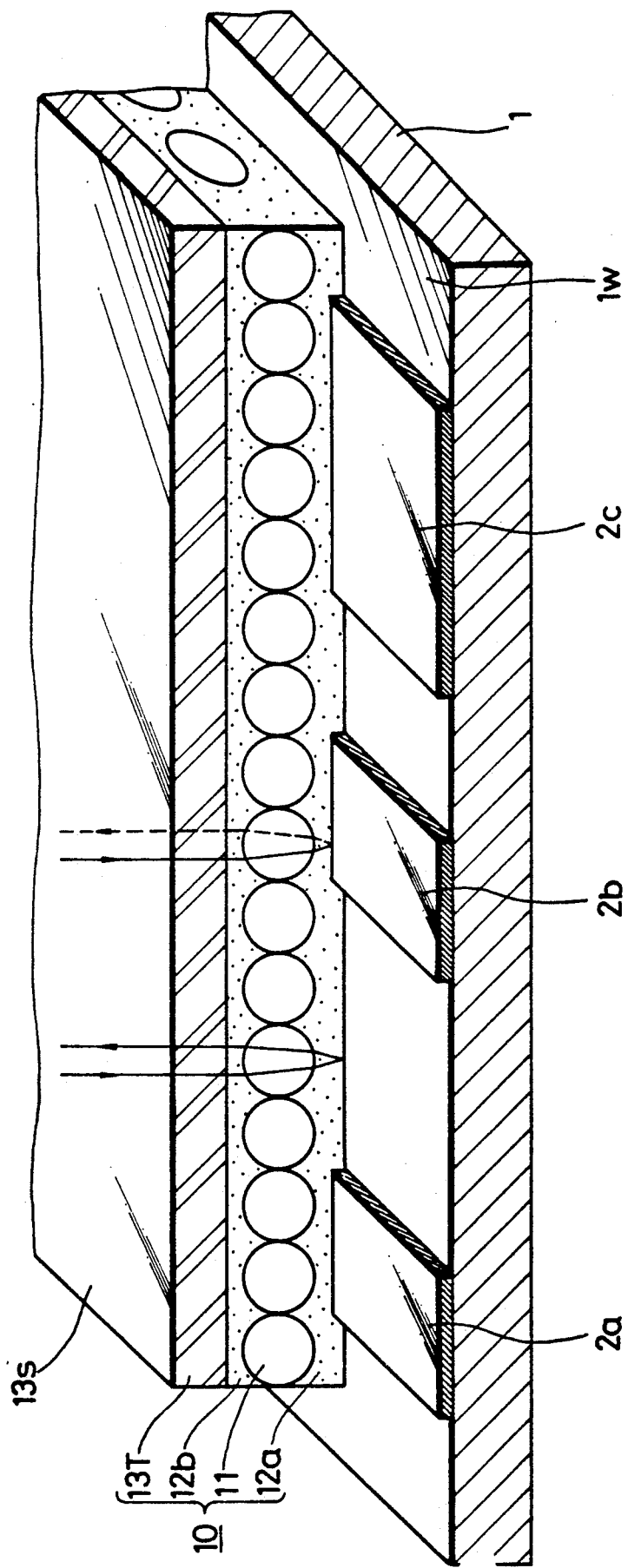
FIG. 3 is a perspective view of a retroreflective sheet having an adhesive surface according to an embodiment of the present invention.

Referring to the drawings in detail, and initially to FIG. 3, a retroreflective sheet having an adhesive surface will be described. FIG. 3 shows the construction of one embodiment of the present invention. In FIG. 3, like parts corresponding to those of FIG. 1 are marked with the same reference numerals and therefore need not be described in detail.

In FIG. 3, reference numeral 1 denotes a base material, for example, a carton holding goods. A predetermined bar code pattern 2a, 2b, and 2c is already printed on a white surface 1w of the carton 1 with black ink. Reference numeral 10 designates generally a retroreflective sheet having an adhesive surface according to the present invention in which a plurality of glass beads 11 are adhered in high density on one surface of a transparent base film 13T by a bonding agent layer 12b having a small refractive index so as to form a substantially single layer with the transparent base film. A bonding agent layer 12a is also provided on the outside of the glass beads 11, opposite the base film 13T. In this embodiment, the bonding agent layers 12a, 12b, and the base film 13T are all transparent so that the incident and reflected light beams do not refract as they travel through these layers. The retroreflective sheet 10 is adhered to the base material 1 by means of the outside bonding agent layer 12a as shown in FIG. 3.

Light beams emitted from a bar code reader (not shown) are irradiated on the outer surface 13s of the base film 13T. If the refractive indices of the glass beads 11 and the transparent bonding agent layers 12a and 12b are properly selected, ranging for example between 2.0-2.3, and 1.4-1.6, respectively, then the light beams that travel through the glass beads 11 to the surface 1w of the base member 1, reflect off of the surface 1w, and travel back through the glass beads 11 can be substantially collimated with the incident light beams.

In this embodiment, the incident light beams that reach the black ink bar code 2a, 2b and 2c are absorbed, that is, no light is reflected from the black ink portions, as illustrated by a broken line extending from 2b in FIG. 3.

In this embodiment, the surface 13s of the base film 13T is formed as a non-glossy, silk surface to prevent the incident light beams from reflecting off of the portions of the surface 13s corresponding to the ink portions of the bar code and interfering with the light beams reflected from the bright surface 1w, thereby maintaining a significant signal-to-noise (S/N) ratio of the read-out signal.

According to the first embodiment of the present invention, all that is required is that the retroreflective sheet having an adhesive surface be adhered to the existing bar code, and the reflected light beams corresponding to the bar code patterns are intensified by being collimated in the predetermined direction back to the bar code reader. Therefore, the optical information represented by the intensified reflected light can be read from a more distant location with ease without modifying either the bar code itself or the conventional bar code reader. Further, according to this first embodiment of the present invention, the retroreflective sheet serves to protect the existing bar codes from damage.

A retroreflective sheet having an adhesive surface according to another embodiment of the present invention will be described hereinafter with reference to FIG. 4. In FIG. 4, like parts corresponding to those of FIGS. 1 and 3 are marked with the same reference numerals and therefore need not be described in detail.

According to the second embodiment of the present invention as illustrated in FIG. 4, when there is no preexisting bar code pattern on the white surface 1w of the base member 1, a new bar code pattern 2d, 2e, and 2f is printed on the surface 13s of the base film 13T with black ink by means of a thermal transfer-printing process, for example.

When the retroreflective sheet is formed according to the second embodiment, incident light beams are not reflected from the bar code pattern 2d, 2e, and 2f. The light beams that are reflected from the portions of the surface 13s of the base film 13T that are not covered with the bar code pattern 2d, 2e, and 2f are substantially parallel to the incident light beams, similar to the first embodiment.

According to the second embodiment in FIG. 4, the retroreflective sheet of the present invention having the bar code pattern on the surface 13s is simply adhered to the highly reflective surface Pw of the product, and the new bar codes can be remotely read by a conventional bar code reader.

Although the glass beads are bonded to one surface of the base film to form the retroreflective optical layer in the above-mentioned first and second embodiments, a variation is also possible. That is, a base film made of polyvinyl chloride resin, for example, can be softened by a heating process, and the glass beads can be inserted into the softened base film with pressure or the like, so that the glass beads form a layer inside of the base film.

In addition, the glass beads may be substituted for by other suitable material, such as pyramid-shaped microprisms.

Furthermore, although the optical information in the first and second embodiments of the present invention is in the form of bar codes, the optical information employed may also be visual image information such as characters and figures. In that case, the outside bonding agent layer 12a may be removable, or peelable, if necessary.

As set out above in detail, the retroreflective sheet of the present invention is formed of a retroreflective optical layer that is adhered on a transparent base film. The retroreflective sheet is then adhered to a coded reflecting member to obtain a retroreflective sheet having an adhesive surface through which optical information can be read with ease from a remote distance.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A retroreflective sheet for adhesion to a surface comprising:
    a transparent base film;
    a plurality of retroreflective members substantially uniformly distributed with a high density and adhered to an inner surface of said transparent base film by a first transparent bonding agent layer; and a second transparent bonding agent layer applied on the outside of said retroreflective members opposite said transparent base film, wherein an exposed surface of said second transparent bonding agent layer is adhered to a reflecting surface having optical information formed thereon as a pattern of non-reflecting areas between the reflecting surface and the second transparent bonding agent layer, thereby increasing an amount of light reflected from said reflecting surface that passes back through said first and second transparent bonding agent layers, said retroreflective members, and said transparent base film.

2. A retroreflective sheet according to claim 1, wherein an outer surface of said transparent base film is non-glossy, thereby reducing an amount of light reflected thereby.

3. A retroreflective sheet according to claim 1, wherein said transparent base film is made of polyvinyl chloride resin.

4. A retroreflective sheet according to claim 1, wherein said retroreflective members are substantially spherical glass beads.

* * * * *